E. C. VILLIERS.
GEARING.
APPLICATION FILED OCT. 30, 1919.
1,368,586.
Patented Feb. 15, 1921.
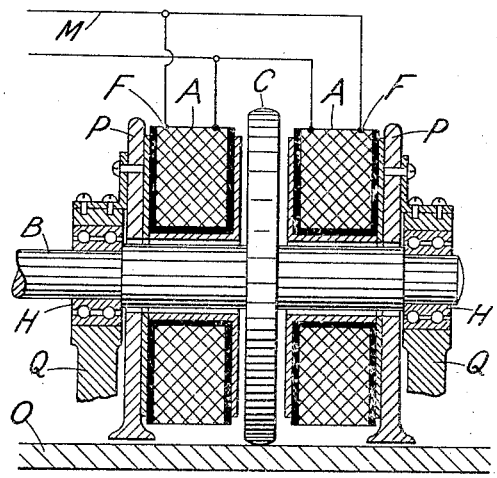
Inventor
Edward C. Villiers
by Wm H Babcock & Son
Attorneys.

UNITED STATES PATENT OFFICE.

EDWARD CECIL VILLIERS, OF ASCOT, ENGLAND.

GEARING.

1,368,586.     Specification of Letters Patent.     Patented Feb. 15, 1921.

Application filed October 30, 1919. Serial No. 334,608.

*To all whom it may concern:*

Be it known that I, EDWARD CECIL VILLIERS, a subject of the King of Great Britain and Ireland, residing at Hendersyde, Ascot, Berkshire, England, have invented new and useful Improvements in Gearing, of which the following is a specification.

This invention relates to gearing. According to my present improvements, the adhesion of the parts required to be geared together is obtained by magnetic attraction without relying upon either external pressure or toothed engagement of the geared parts. Noise and friction and wear of surfaces are thus reduced or eliminated.

My invention can be applied to many objects requiring the mutual engagement of a wheel and the surface of any other object. Such wheel or its periphery may be either smooth, roughened, or milled. For this purpose, the contacting surfaces are made of magnetizable material. A thin layer of non-magnetic material may however, be interposed without greatly impairing their magnetic adhesion.

In order to gain the desired results, the wheel is magnetized by an electrically energized coil in its vicinity. The wheel may be either solid or laminated.

According to one arrangement, the wheel, axle, shaft or spindle is made to serve as the core of an electromagnet. The magnetism produced in it will then cause it to adhere to any surface of iron or steel upon or against which it may roll or be rolled.

According to my invention as applied to an automatic course recorder, the magnetic wheel is mounted fast on a magnetizable spindle which is surrounded by the windings of a solenoid. Iron or steel plates at each end of the spindle serve not only as bearings for the same, but also as the pole pieces of the magnet. Ball or roller bearings should be provided which will eliminate any tendency of the spindle to adhere magnetically to the bearings, by reason of the rotation of the balls or rollers, notwithstanding that the latter may themselves become magnetized.

The bottom edges of the plates should be straight and made to come close to—but not quite touching—the iron or steel surface on which the wheel runs, the plates being connected to the machine or instrument in any way.

The invention will be more fully described herein with reference to the accompanying drawing which represents a wheel according to my invention magnetically attracted to an iron plate.

It must be understood that the drawing shows an example of only one form which my invention may take and it is not to be considered as limiting my claims.

The device shown is a wheel C on a shaft B of an automatic course recorder magnetized as explained below, and adapted to run on an iron plate O in any direction. An energizing coil A is shown around the shaft B and fixed to plates P which are attached to the machine or instrument. A similar effect will be produced if alternatively the coil A be mounted to revolve with the wheel C, but not so conveniently as it would be necessary to introduce brushes and ring contacts.

When held stationary in relation to the rotatable wheel C, as in the drawing, the contacts F F may be of the fixed or non-sliding kind.

The shaft B is journaled in bearings H H provided with ball races to prevent anti-rotary adhesion due to magnetization of the bearings. The latter are carried by a frame part Q belonging to the machine or instrument. When the coil A is energized, the wheel C and shaft B both become a magnet, the wheel C being one of the poles, and the plates P respectively two other poles. In order to increase the magnetic effects, the end pole pieces P are shaped flat at their bottom and brought close to the plate O so as to leave a small air gap. Consequently the wheel C adheres to the plate O. The magnetic circuit passes from the wheel C, through the plate O, and across the air gaps between the plates P and the plate O, through the plates P and the ball bearings H to the shaft B, and back to the wheel C, which completes the circuit. The traveling machines or instruments fitted with a wheel magnetized according to my invention together with another wheel or wheels either of the same kind or any other suitable kind or equivalent means for supporting the machine or instrument can be traversed in any direction without slipping, and may be made to run at any angle or even in a vertical direction or upside down, being held against the iron or steel surface by the magnetization produced in the manner above described.

It is unnecessary to supply a detailed description of the invention as applied to its various uses, for instance, as a traveler carrying cutting, riveting or other working tools or devices as the general arrangement will be the same as already described herein. It will be noticed that the wheel C makes practically point contact, and is therefore adapted to be steered universally in any direction upon the plate O.

I claim:

1. In a device adapted to run upon a surface, a shaft carrying a friction wheel, a flange carried by the same shaft separated from the wheel by a space, an electro-magnetic coil within said space coaxial with said shaft, the wheel being virtually in frictional contact with a metal surface and the flange being separated from the latter, an element provided with said surface, the wheel, the flange and the surface all being of magnetizable material.

2. In a device adapted to run upon a surface, a shaft carrying a friction wheel of magnetizable material, a flange, also of magnetizable material, carried by the same shaft separated from the wheel by a space, an electro-magnetic coil within said space coaxial with said shaft, an element having a surface of magnetizable material, means for holding said wheel so that whether running or stationary it will be in contact with said surface in a plane at right angles to said surface, while there will be a gap between the latter and the flange aforesaid.

3. In a device adapted to run upon a surface, a shaft carrying a friction wheel of magnetizable material, an element having a surface of magnetizable material upon which said wheel can run, magnetizable non-rotatable flanges upon the same shaft, such flanges constituting pole pieces and being straight along those edges which are nearest to said surface from which they are separated by a small gap, together with electro-magnetic coils situated coaxially on either side of said friction wheel.

EDWARD CECIL VILLIERS.